(12) United States Patent
Heimann et al.

(10) Patent No.: US 12,715,054 B2
(45) Date of Patent: Aug. 25, 2026

(54) TOOL AND METHOD FOR ROLL GROOVING A WORKPIECE

(71) Applicant: MILWAUKEE ELECTRIC TOOL CORPORATION, Brookfield, WI (US)

(72) Inventors: Joshua P. Heimann, Milwaukee, WI (US); Benjamin A. Sands, Jackson, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 699 days.

(21) Appl. No.: 17/891,576

(22) Filed: Aug. 19, 2022

(65) Prior Publication Data

US 2023/0058084 A1 Feb. 23, 2023

Related U.S. Application Data

(60) Provisional application No. 63/234,900, filed on Aug. 19, 2021.

(51) Int. Cl.
*B21D 17/00* (2006.01)
*B23C 3/34* (2006.01)

(52) U.S. Cl.
CPC .................................... *B23C 3/34* (2013.01)

(58) Field of Classification Search
CPC ...... B21D 17/00; B21D 17/02; B21D 17/025; B21D 17/04; B21D 41/04
See application file for complete search history.

(56) References Cited

U.S. PATENT DOCUMENTS 2,056,192 A 10/1936 Hothersall
2,139,682 A 12/1938 Hothersall
2,160,866 A 6/1939 Hothersall
2,421,667 A 6/1947 Veit et al.
3,122,830 A 3/1964 Dawson et al.
3,299,680 A 1/1967 Thompson
3,648,500 A 3/1972 Vaill
3,720,992 A 3/1973 Hyatt
(Continued)

FOREIGN PATENT DOCUMENTS

CN 2404609 Y 11/2000
CN 2573120 Y 9/2003
(Continued)

OTHER PUBLICATIONS

International Search Report and Written Opinion for Application No. PCT/US2022/040876 dated Dec. 9, 2022 (10 pages).
(Continued)

*Primary Examiner* — Teresa M Ekiert
(74) *Attorney, Agent, or Firm* — Michael Best & Friedrich LLP

(57) ABSTRACT

A tool configured to form a groove in a pipe includes a housing, a spindle rotatable about a drive axis, a die shaft defining a die shaft axis, a die rotatably coupled to the die shaft about a die axis that is offset relative the die shaft axis, the die configured to form a groove into the pipe, and a drive assembly. The drive assembly includes a spindle drive portion configured to rotate the spindle about the drive axis and thereby rotate the tool with respect to the pipe, and a die shaft drive portion configured to rotate the die shaft to vary a distance between the die axis and the drive axis.

19 Claims, 13 Drawing Sheets

(56) References Cited

U.S. PATENT DOCUMENTS

| | | | | |
|---|---|---|---|---|
| 3,744,356 | A | 7/1973 | Slator et al. | |
| 3,754,424 | A | 8/1973 | Costanzo | |
| 3,835,738 | A | 9/1974 | Kellum et al. | |
| 3,851,992 | A | 12/1974 | Sawada et al. | |
| 4,091,648 | A | 5/1978 | McCaslin | |
| 4,328,722 | A | 5/1982 | Wohlhaupter et al. | |
| 4,819,385 | A | 4/1989 | Baumann et al. | |
| 5,217,724 | A | 6/1993 | Lenters | |
| 5,245,848 | A | 9/1993 | Lee, Jr. et al. | |
| 5,282,375 | A | 2/1994 | Lee, Jr. et al. | |
| 5,293,794 | A | 3/1994 | Mosey | |
| 5,349,836 | A | 9/1994 | Lee, Jr. | |
| 5,653,138 | A | 8/1997 | Kruger et al. | |
| 6,688,150 | B1 | 2/2004 | Westley et al. | |
| 6,755,101 | B1 | 6/2004 | Waring | |
| 6,968,761 | B2 | 11/2005 | Frank | |
| 6,993,949 | B2 * | 2/2006 | Dole | B21D 17/04 74/625 |
| 8,163,040 | B2 | 4/2012 | Teramoto | |
| 8,777,277 | B2 | 7/2014 | Dole et al. | |
| 9,010,164 | B2 | 4/2015 | Novitsky et al. | |
| 9,038,428 | B2 | 5/2015 | Novitsky et al. | |
| D744,556 | S | 12/2015 | Skrjanc et al. | |
| D744,558 | S | 12/2015 | Dunkin et al. | |
| D748,699 | S | 2/2016 | Moherman et al. | |
| 9,333,543 | B2 | 5/2016 | Dole et al. | |
| 9,333,548 | B2 | 5/2016 | Puzio et al. | |
| 9,586,275 | B2 | 3/2017 | Priha et al. | |
| 9,849,525 | B2 | 12/2017 | Pierce et al. | |
| 9,901,997 | B2 | 2/2018 | Pierce et al. | |
| 9,950,372 | B2 | 4/2018 | Moherman et al. | |
| 9,956,617 | B2 | 5/2018 | Conrad et al. | |
| 9,962,769 | B2 | 5/2018 | Conrad et al. | |
| 10,059,017 | B2 | 8/2018 | Kawakami | |
| 10,161,547 | B2 | 12/2018 | Novitsky et al. | |
| 10,189,070 | B2 | 1/2019 | Olesinska et al. | |
| 10,449,589 | B2 | 10/2019 | Price et al. | |
| 10,456,840 | B2 | 10/2019 | Conrad et al. | |
| 10,807,145 | B2 | 10/2020 | Wan et al. | |
| 10,913,099 | B2 | 2/2021 | Mihailescu | |
| 10,960,450 | B2 | 3/2021 | Dole | |
| 2002/0083750 | A1 | 7/2002 | Kutschker et al. | |
| 2003/0156913 | A1 | 8/2003 | Willis | |
| 2005/0178179 | A1 | 8/2005 | Dole | |
| 2006/0230802 | A1 | 10/2006 | Andre | |
| 2014/0260840 | A1 | 9/2014 | Mori | |
| 2016/0059287 | A1 * | 3/2016 | DiPierdomenico | B21D 17/04 72/252.5 |
| 2019/0255593 | A1 | 8/2019 | Meador et al. | |
| 2021/0053102 | A1 | 2/2021 | Dole | |
| 2021/0129228 | A1 | 5/2021 | Pechstein et al. | |
| 2021/0170468 | A1 | 6/2021 | Dole | |
| 2022/0118498 | A1 | 4/2022 | Radtke et al. | |
| 2022/0168793 | A1 | 6/2022 | Davies et al. | |
| 2023/0090597 | A1 | 3/2023 | Maksimowski et al. | |

FOREIGN PATENT DOCUMENTS

| | | | |
|---|---|---|---|
| CN | 100415439 | C | 9/2008 |
| CN | 201432108 | Y | 3/2010 |
| CN | 204148324 | U | 2/2015 |
| CN | 204686023 | U | 10/2015 |
| CN | 205926729 | U | 2/2017 |
| CN | 206241004 | U | 6/2017 |
| CN | 107824655 | A | 3/2018 |
| CN | 108057751 | A | 5/2018 |
| CN | 208341743 | U | 1/2019 |
| CN | 209829953 | U | 12/2019 |
| CN | 212733709 | U | 3/2021 |
| CN | 216027333 | A | 3/2022 |
| DE | 2361405 | A1 | 6/1974 |
| DE | 9216442 | U1 | 1/1993 |
| DE | 4407613 | A1 | 3/1995 |
| DE | 10059887 | A1 | 6/2002 |
| DE | 10160032 | A1 | 6/2003 |
| DE | 10160031 | B4 | 9/2006 |
| DE | 102014019481 | A1 | 6/2016 |
| EP | 0425924 | A1 | 5/1991 |
| EP | 1618972 | A1 | 1/2006 |
| EP | 2036642 | A2 | 3/2009 |
| EP | 3666435 | A1 | 6/2020 |
| KR | 20080006187 | U | 12/2008 |
| KR | 101838007 | B1 | 3/2018 |
| WO | 02081119 | A1 | 10/2002 |
| WO | 2015185363 | A1 | 12/2015 |

OTHER PUBLICATIONS

Extended European Search Report for Application No. 22859214.3 dated Apr. 11, 2025 (7 pages).

* cited by examiner

AC
14
174
26
166d
RC
54
170
35
22
110
12

166d
14
RC
RC
RC
RC
12

TOOL AND METHOD FOR ROLL GROOVING A WORKPIECE

CROSS-REFERENCE TO RELATED APPLICATIONS

This application claims priority to U.S. Provisional Patent Application No. 63/234,900, filed Aug. 19, 2021, the entire content of which is incorporated herein by reference.

FIELD

The present disclosure relates to tools for machining a workpiece, and, more particularly, to handheld tools and methods for roll grooving a workpiece, such as a pipe.

BACKGROUND

Roll grooving tools or "roll groovers" are typically used to form a rolled groove in an outer diameter of the pipe by deforming the material of the pipe. Typical roll groovers are configured to engage the pipe and roll a grooving die around the pipe to form the groove.

SUMMARY

The invention provides, in one independent aspect, a tool configured to form a groove in a pipe. The tool includes a housing, a spindle rotatable about a drive axis, a die shaft defining a die shaft axis, a die rotatably coupled to the die shaft about a die axis that is offset relative the die shaft axis, and a drive assembly. The die is configured to form a groove into the pipe. The drive assembly includes a spindle drive portion configured to rotate the spindle about the drive axis and thereby rotate the tool with respect to the pipe, and a die shaft drive portion configured to rotate the die shaft to vary a distance between the die axis and the drive axis.

The invention provides, in another independent aspect, a tool configured to form a groove in a pipe. The tool includes a housing including a battery receptable configured to receive a battery. The tool further includes a first motor configured to rotate a spindle about a drive axis, a die rotatably coupled to a die shaft about a die axis that is offset relative the drive axis, and a second motor configured to rotate an input shaft about an input shaft axis to rotate the die shaft and vary a distance between the die axis and the drive axis. The die is configured to form a groove into the pipe. The input shaft axis is offset by a non-zero angle relative the drive axis.

Yet another independent aspect of the invention provides a tool configured to form a groove in a pipe. The tool includes a housing, a spindle rotatably driven about a drive axis, and a shaft rotatably driven about a shaft axis. The shaft includes an input portion including an input axis colinear with the shaft axis, and an output portion including an output axis eccentric relative the input axis. The output portion is configured to support a grooving die. A spacing between the drive axis and the input axis is fixed, and a spacing between the drive axis and the output axis is varied by an amount the shaft rotates.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
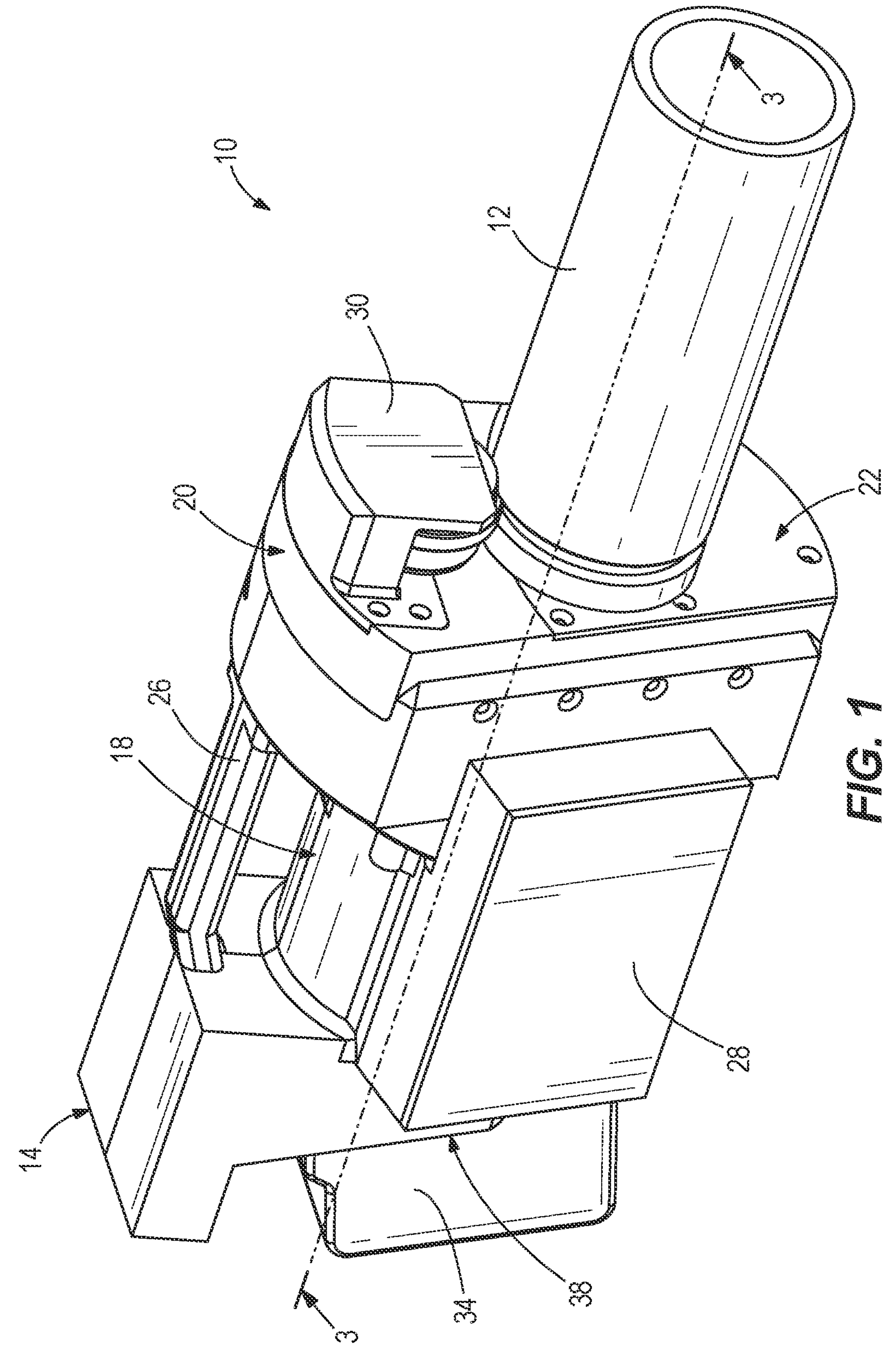
FIG. 1 is a perspective view of a roll grooving tool, according to an embodiment of the present invention, illustrating a workpiece supported on the roll grooving tool.

FIG. 1 illustrates a tool 10 in the form of a roll grooving tool 10 or "roll groover" that is operable to form a groove (e.g., by deforming, cold working, bending, etc.) in a workpiece 12 such as a pipe. In some embodiments, the roll groover 10 may be used to form grooves in pipes made of a variety of different materials, including but not limited to carbon steel, stainless steel, copper, aluminum, polyvinyl chloride, thermoplastic, or the like.

The illustrated roll groover 10 includes a housing 14 with a first motor housing portion 18, a second motor housing portion 20 coupled to the first motor housing portion 18 (e.g., by a plurality of fasteners), a front housing portion 22 coupled to the first motor housing portion 18 and/or second motor housing portion 20, and a handle portion 26 extending from the first motor housing portion 18 in a direction generally parallel to the second motor housing portion 20. In the illustrated embodiment, the handle portion 26 and the first motor housing portion 18 are defined by cooperating clamshell halves. Other embodiments of the roll groover 10 may include multiple handles positioned at different locations of the housing 14. The illustrated housing 14 also includes one or more controller housing portions 28. In the illustrated embodiment, the housing 14 further includes a die guard housing portion 30.

Referring still to FIG. 1, the roll groover 10 includes a battery 34 removably coupled to a battery receptacle 38 located at a rear or bottom end of the housing 14. In some embodiments, the battery receptacle 38 is located at a rear end of the handle portion 26. In the illustrated embodiment, about 50% by weight of the material of the roll groover 10 is metal (e.g., aluminum, steel, magnesium, etc.) and about 50% by weight of the material of the roll groover 10 is composite material (e.g., plastic, fiber based composites such as fiberglass, carbon fiber, and Kevlar). By incorporating a blend of metal materials and composite materials, the weight of the roll groover 10 is reduced, which is particularly advantageous as the illustrated roll groover 10 is configured for handheld transportation and operation. For example, the roll groover 10 may be configured and assembled such that, even with a power source (e.g., battery pack 34) attached, the roll groover weighs less than approximately 52 pounds. A preferred embodiment of the roll groover 10, with the battery 34 attached, weighs less than 50 pounds.

Figure 2:
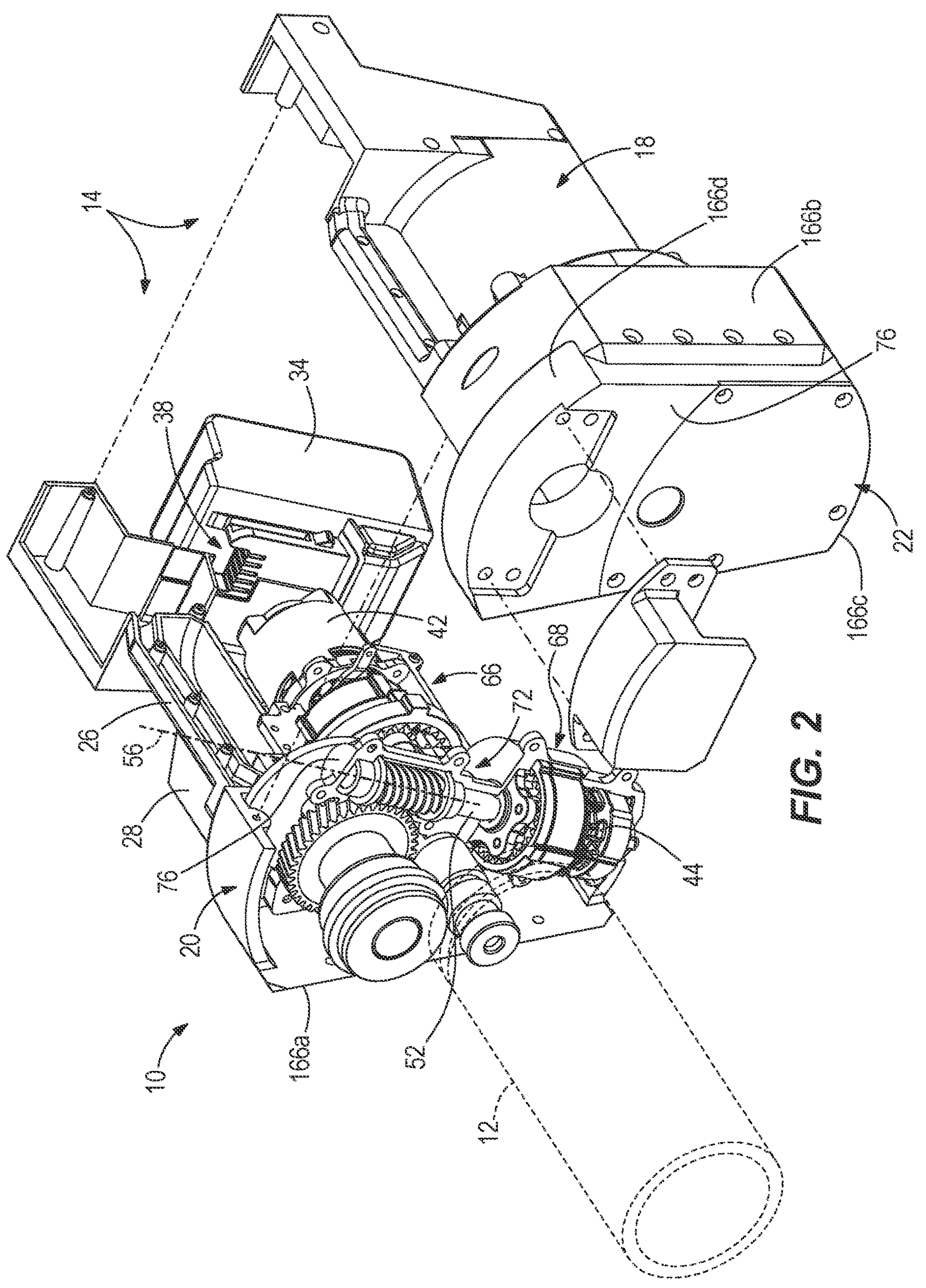
FIG. 2 is partially exploded perspective view of the tool of FIG. 1.
Figure 3:
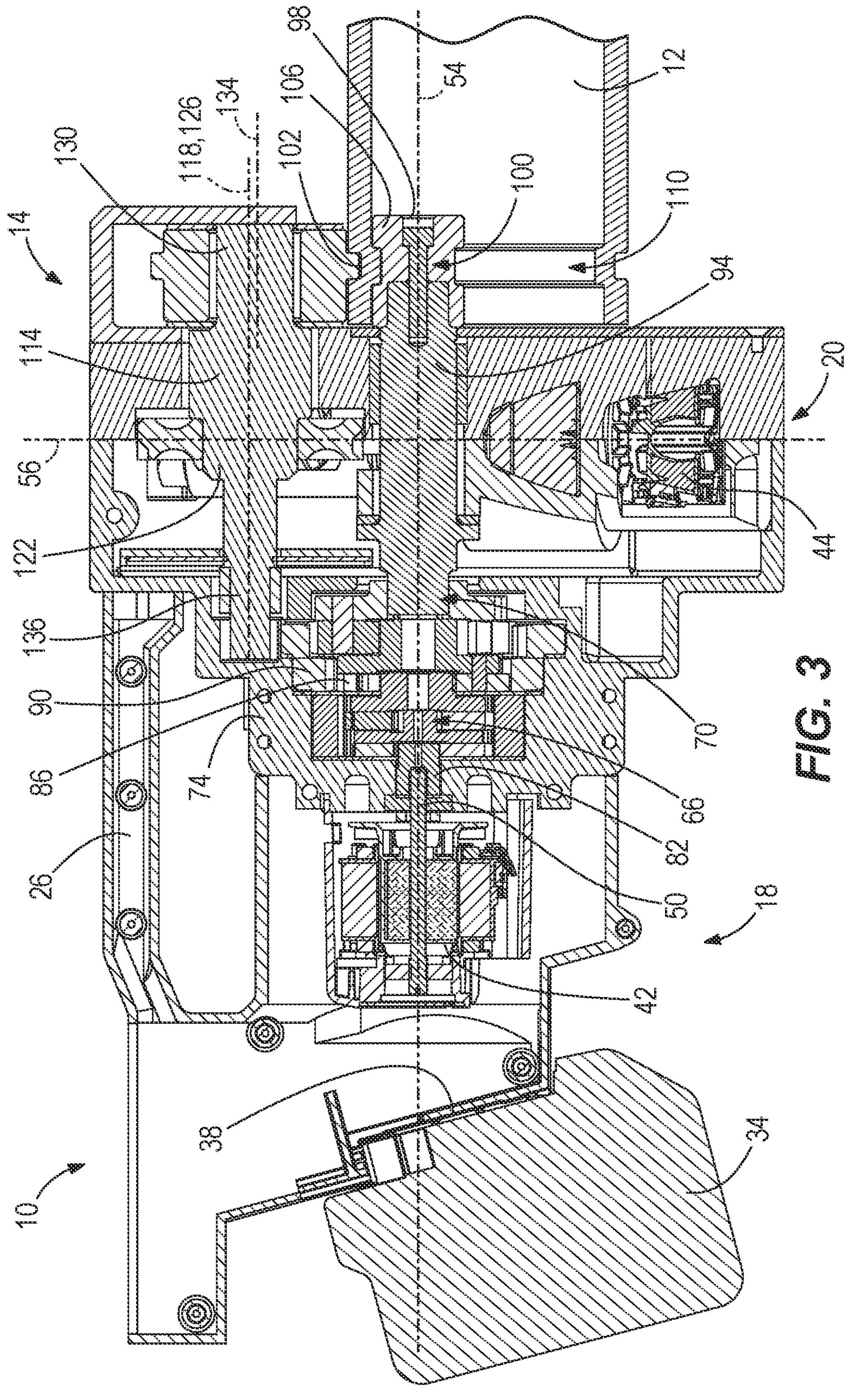
FIG. 3 is cross-sectional view of the tool of FIG. 1 taken through section line 3-3.

With references to FIGS. 2 and 3, a first electric motor 42 supported within the first motor housing portion 18 and a second electric motor 44 supported within the second motor housing portion 20 each receive power from the battery 34 via the battery receptacle 38 when the battery 34 is coupled to the battery receptacle 38. In other embodiments, first motor 42 may receive power from a first battery and the second motor 44 may receive power from a second battery. Alternatively, the motors 42, 44 may draw power from multiple batteries wired in series or in parallel. In the illustrated embodiment, the motors 42,44 are brushless direct current ("BLDC") motors. In other embodiments, other types of motors may be used (e.g., digital motors, stepper motors, servo motors, brushed motors).

The first motor 42 includes an output rotor or shaft 50 (FIG. 3), and the second motor 44 includes an output rotor or shaft 52 (FIG. 2). The shaft 50 of the first motor 42 is rotatable about a drive axis 54, and the shaft 52 of the second motor 44 is rotatable about a drive axis (also referred to herein as an input drive axis) 56. Each of the motors 42, 44 may also include a fan coupled to the rotor (e.g., via a splined member fixed to the rotor) to provide cooling air to the motors 42, 44.

The roll groover 10 also includes a switch (e.g., trigger switch; not shown) supported by the housing 14 for operating each of the motors 42, 44 (e.g., via suitable control circuitry provided on one or more printed circuit board assemblies ("PCBAs") that control power supply and command of the motors 42, 44. In the illustrated embodiment, one or more PCBAs 64 (FIG. 4) are housed in the controller housing portions 28, which may be formed of metal or a composite material depending on a desired mounting arrangement for the PCBA 64. In other embodiments, the roll groover 10 may include a power cord for connecting to a source of AC power such as a wall outlet or generator. As a further alternative, the roll groover 10 may be configured to operate using a non-electrical power source (e.g., a pneumatic or hydraulic power source, etc.). Preferably, the switching electronics (e.g., MOSFETs, IGBTs, or the like) for controlling power supplied to each of the motors 42, 44 from the battery 34 are provided together on the PCBA 64. In other words, the PCBA 64 is a common circuit board for controlling power supply and operation of the two motors 42, 44.

The battery 34 may be a power tool battery pack 34 generally used to power a power tool, such as a roll groover, an electric drill, an electric saw, and the like (e.g., an 18 volt rechargeable battery pack, or an M18 REDLITHIUM battery pack sold by Milwaukee Electric Tool Corporation). The battery pack 34 may include lithium ion (Li-ion) cells. In alternate embodiments, the battery packs may be of a different chemistry (e.g., nickel-cadmium (NiCa or NiCad), nickel-hydride, and the like). In the illustrated embodiments, the battery pack 34 is an 18-volt battery pack. In alternate embodiments, the capacity of the battery pack may vary (e.g., the battery pack may be a 4-volt battery pack, a 28-volt battery pack, a 40-volt battery pack, or battery pack of any other voltage). The battery pack may further include an indicator to display the current state of charge of the battery pack and/or other characteristics of the battery pack. The illustrated roll groover 10 may be operated with battery packs of different voltages up to approximately 84-volts.

Figure 4:
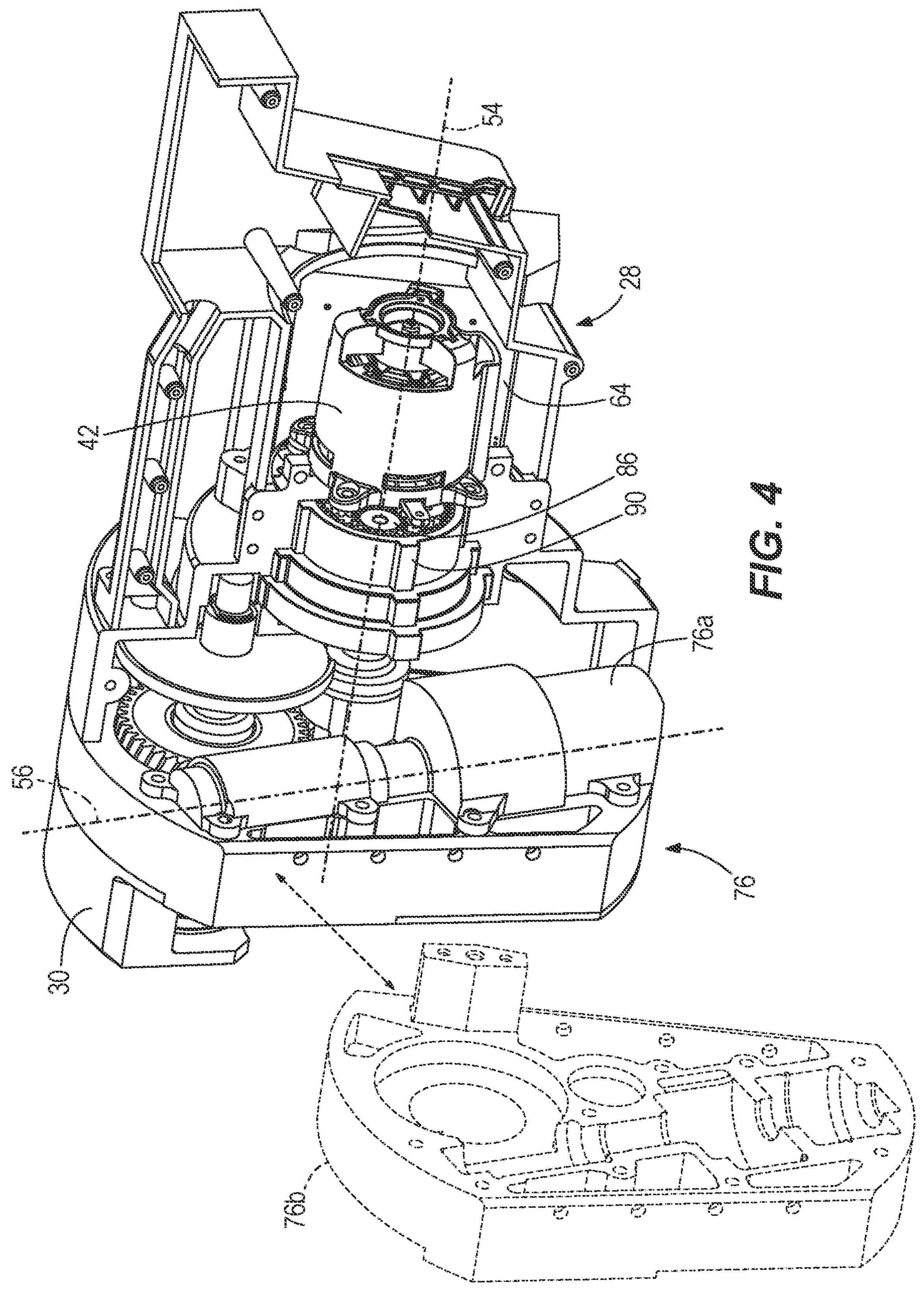
FIG. 4 is another perspective view of the tool of FIG. 1 with a portion of a tool housing hidden to reveal drive elements of the tool.

Referring to FIGS. 2-4, the roll groover 10 further includes a first gear assembly 66 coupled to the first motor output shaft 50 and, as illustrated in FIG. 3, a first drive assembly 70 coupled to an output of the first gear assembly 66. The first gear assembly 66 may be configured in any of a number of different ways to provide a speed reduction between the output shaft 50 and an input of the drive assembly 70. The first gear assembly 66 is at least partially housed within a gear case 74 fixed to the housing 14.

As illustrated in FIG. 2, the roll groover 10 also includes a second gear assembly 68 coupled to the second motor output shaft 52 and a second drive assembly 72 coupled to an output of the second gear assembly 68. The second gear assembly 68 and the second motor shaft 52 are both rotatable about the input drive axis 56. The second gear assembly 68 is at least partially housed within a gear case 76 that may form a portion of the housing 14. As illustrated in FIG. 4, the gear case 76 includes a front shell 76*a* and a rear shell 76*b* that each include recesses to accommodate the second motor 44, the second gear assembly 68, and the second drive assembly 72.

The illustrated first gear assembly 66 of FIGS. 3 and 4 includes a pinion 82 on the motor output shaft 50 and a multi-stage planetary transmission driven by the pinion 82, each stage including, for example, a plurality of planet gears 86 and a ring gear 90 meshed with each of the planet gears 86 and rotationally fixed within the gear case 74. A last stage carrier (i.e. an output) of the transmission is fixed to a drive shaft 94 of the drive assembly 70 such that the drive shaft 94 is rotatably driven by the motor output shaft 50 through the transmission. That is, rotation of the output shaft 50 rotates the planet gears 86 of each stage, which then advance along the inner circumference of the associated ring gear 90, and thereby rotate the drive shaft 94 at a reduced rate of speed and increased torque. The planet gears 86 could alternatively be bevel gears and/or offset along the drive shaft 94 (e.g., in different planes). In other embodiments, face gearing and cycloidal gears may be utilized in either gear assembly 66, 68.

Referring now particularly to FIG. 3, the drive shaft 94 supports a spindle 98 extending from the front housing portion 22. The spindle 98 is configured to engage and support the workpiece 12 (which may include supporting the groover 10 on the pipe 12 in some embodiments if the pipe 12 is fixed), and the spindle 98 is rotatable about the drive axis 54 via a spindle drive portion 100. In the illustrated embodiment, the spindle 98 is rigidly attached to the drive shaft 94 for co-rotation therewith. The spindle 98 includes a circumferential groove or trough portion 102 positioned between two axially offset circumferential peak portions 106. In other embodiments, the spindle 98 may include multiple troughs and multiple peaks corresponding to the multiple troughs. As will be described in greater detail below, the peaks 106 and trough 102 are shaped and positioned as a template for forming a groove 110 in the pipe 12. Stated another way, the peaks 106 and the trough 102 act as a female die to receive displaced material during a grooving operation.

With continued reference to FIG. 3, the second drive assembly 72 supports a die shaft 114 that defines a major die shaft axis 118. The die shaft 114 is further supported by the housing 14 in an orientation generally transverse to the input drive axis 56. The die shaft 114 includes an input portion 122 having an input axis 126 colinear with the die shaft axis 118, an output portion 130 having a output axis 134 offset relative the input axis 126, a stem portion 136 centered about the die shaft axis 118, and a spacer 144 extending between the input portion 122 and the output portion 130. In the illustrated embodiment, the input portion 122 has a first diameter, the output portion 130 has a second diameter, the stem portion 136 has a third diameter, and the spacer 144 has a fourth diameter. The first and third diameters may be less than the second diameter, and the fourth diameter may be greater than the first diameter. In other embodiments, portions of the die shaft 114 may have different diameters.

Figure 5A:
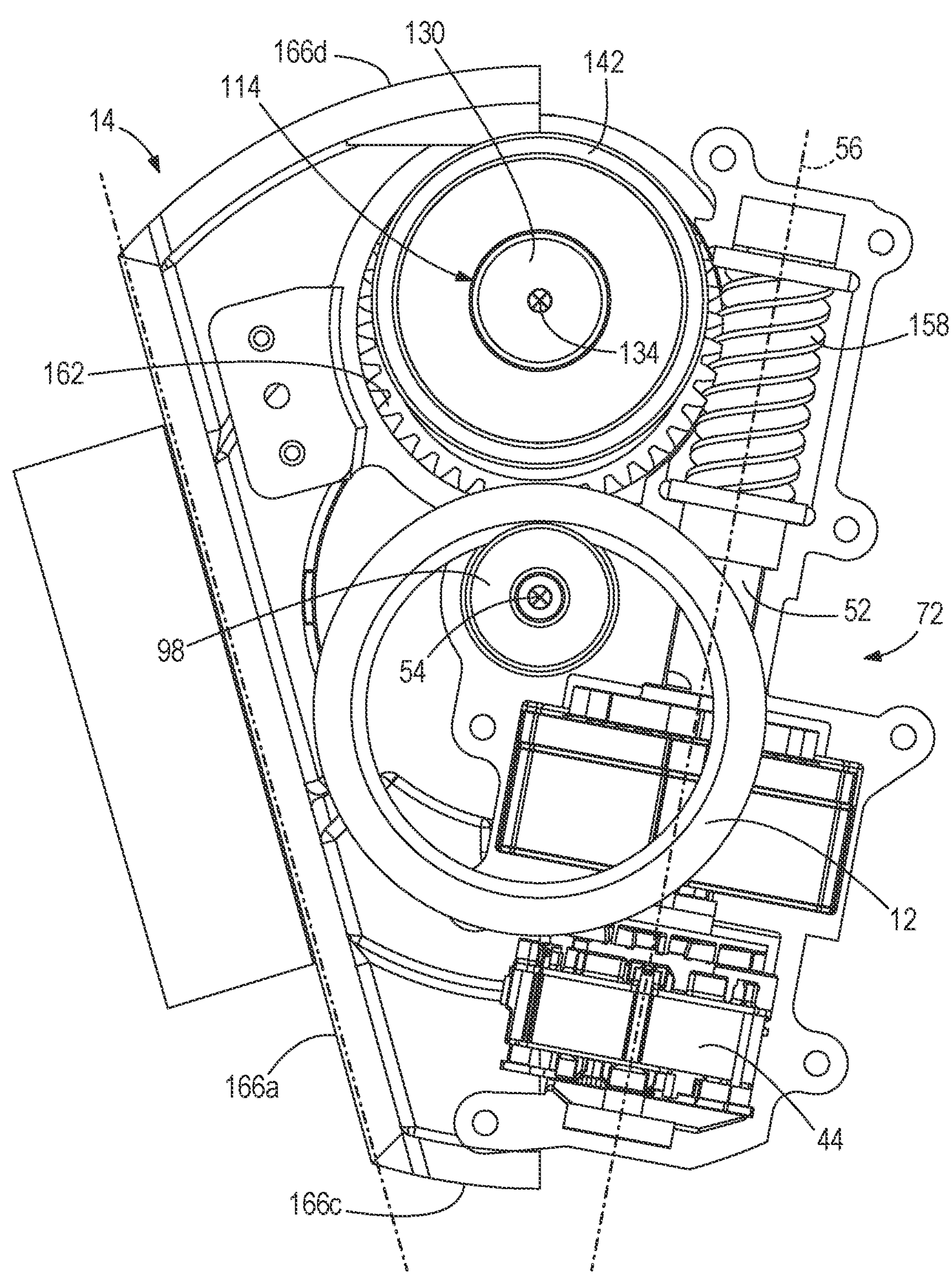
FIG. 5A is a plan view of the tool of FIG. 1, illustrating a grooving member spaced from the pipe.
Figure 5B:
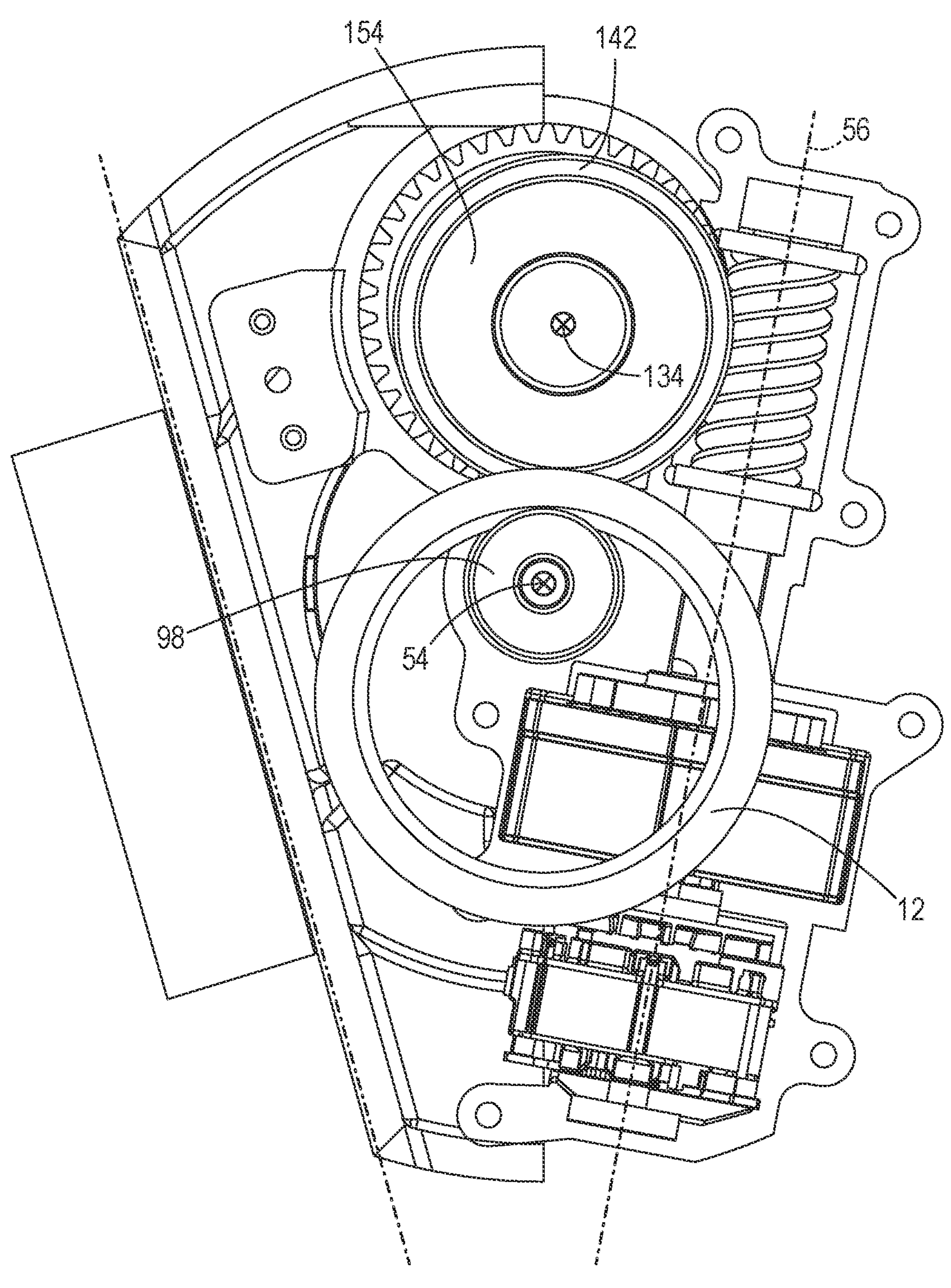
FIG. 5B is a plan view of the tool of FIG. 1, illustrating a grooving member engaged with the pipe.
Figure 6A:
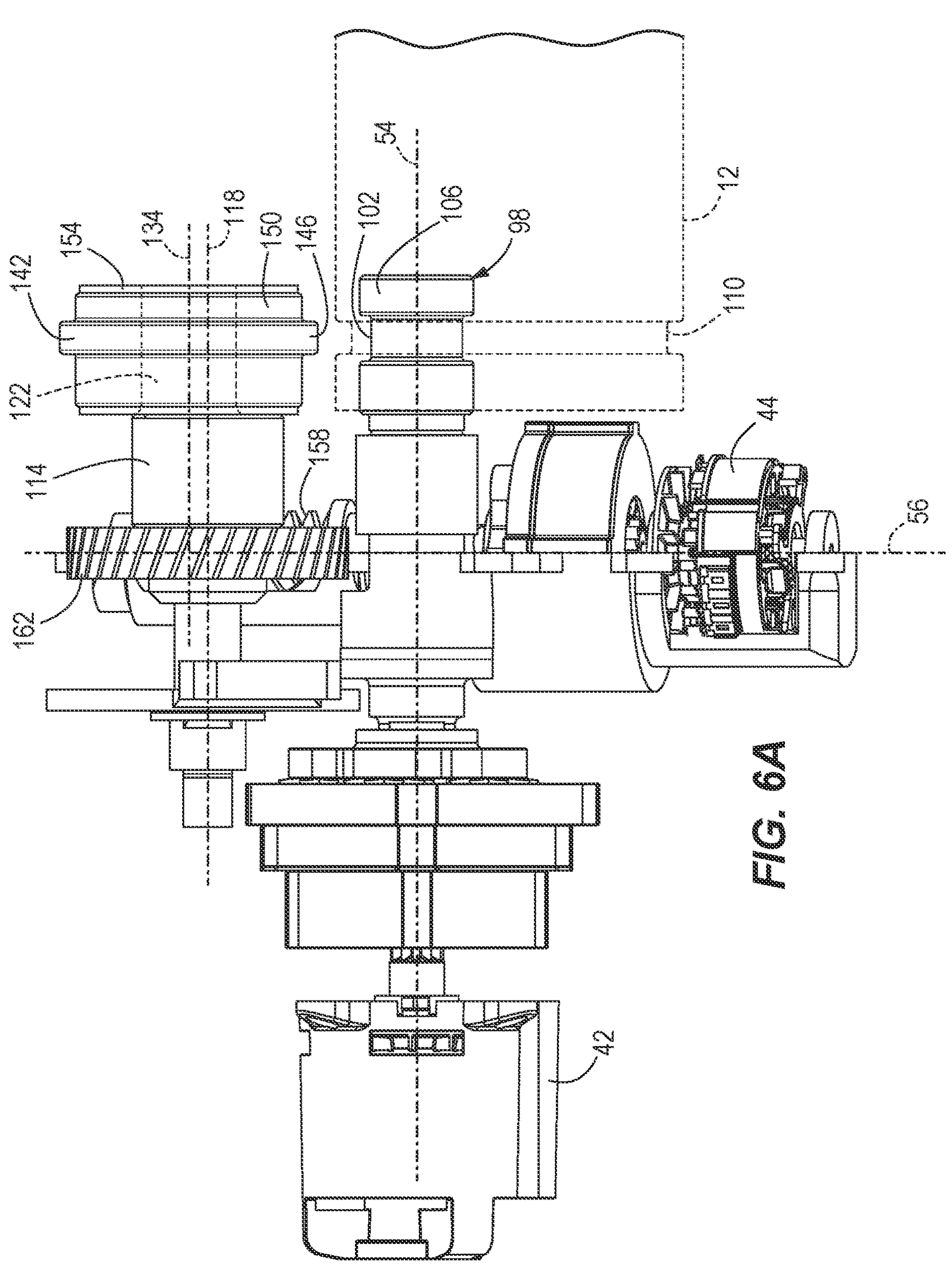
FIG. 6A is a plan view of FIG. 5A with portions of the tool housing hidden.
Figure 6B:
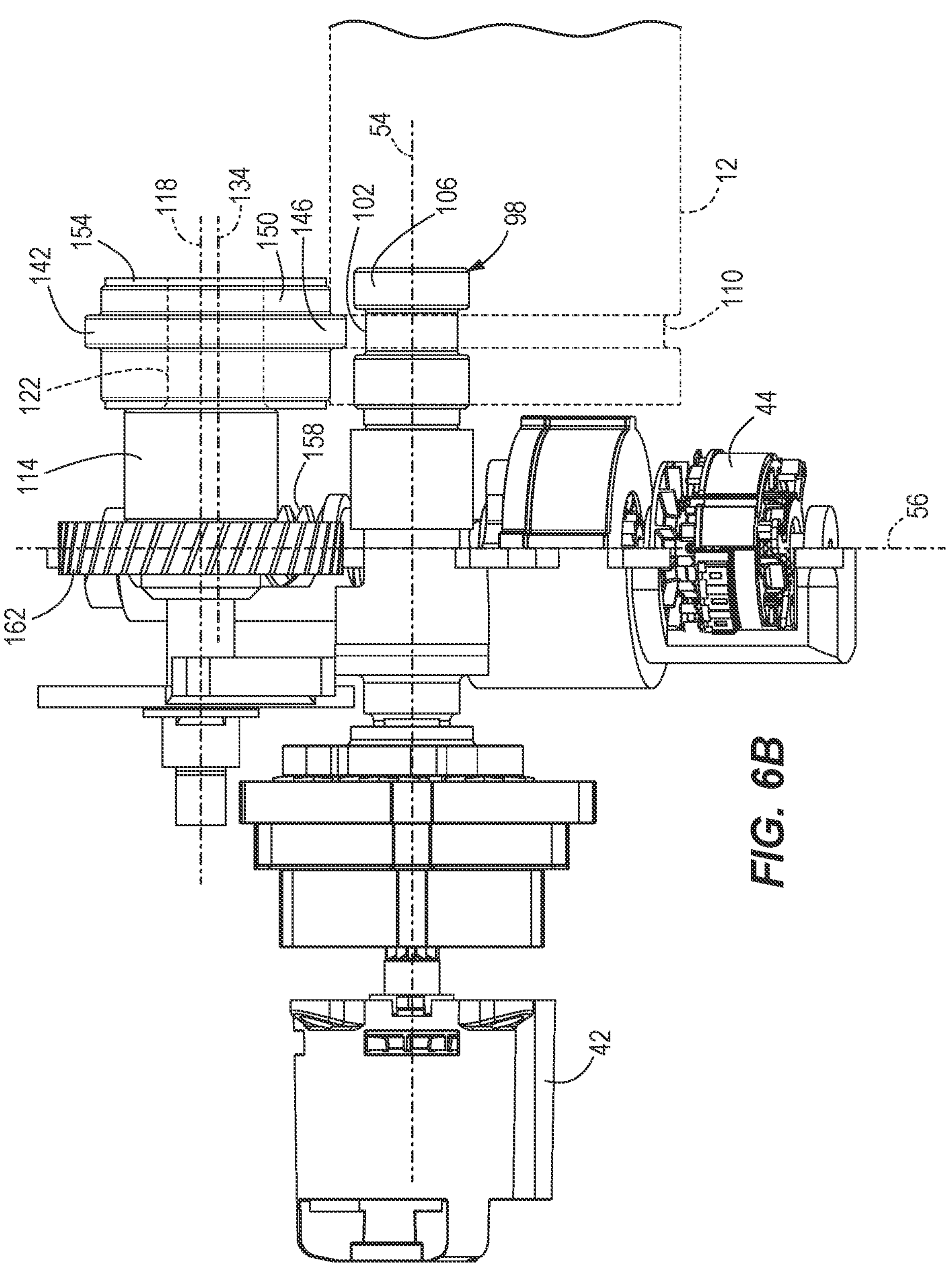
FIG. 6B is a plan view of FIG. 5B with portions of the tool housing hidden.

Referring now to FIGS. 5A-6B, the output portion 130 of the die shaft 114 supports a grooving member or die 142 that is engageable with the pipe 12 to form the groove 110 (FIGS. 6A and 6B) in the pipe 12. More particularly, the die 142 includes, as illustrated in FIGS. 6A and 6B, a die peak 146 that is complementary to the trough 102 of the spindle 98. The die peak 146 is shaped to be pressed against the pipe 12 to deform a portion of the pipe 12 into the trough 102 of the spindle 98. Similarly, the die 142 includes troughs 150 that are complementary to the peaks 106 of the spindle 98. The die troughs 150 may engage an outer periphery of the pipe 12 on either side of the groove formed by the die peak 146 during a grooving process, once the groove is fully formed. In the illustrated embodiment, the die 142 is rotatably mounted on the die shaft 114 via a bearing 154 such that the die 142 is free to rotate against the pipe 12 during a grooving operation. The die guard housing portion 30 (FIG. 4) is provided on the housing 14 to prevent a user from inadvertently contacting the die 142, as the die may be sharp or covered with grooving residue (e.g., sharp metal shavings, lubricant, or the like).

As illustrated in FIGS. 5A and 6A, the second drive assembly 72 is positioned in the housing 14 and includes a worm gear 158 supported on a distal end of the second motor output shaft 52. In the illustrated embodiment, the worm gear 158 is rigidly supported by the shaft 52 for co-rotation therewith such that rotation of the second motor 44 imparts rotation to the worm gear 158. The worm gear 158 includes an elongated helical tooth or ramp that is positioned around the output shaft 52 to mesh with a spur gear 162, which is rigidly attached to the input portion 122 (FIG. 6A) of the die shaft 114. Such a helical-type gear helps reduce noise (e.g., operating noise) within the tool 10. In the illustrated embodiment, the spur gear 162 includes gear teeth radially spaced around an entire circumference of the spur gear 162. In other embodiments, the spur gear may include gear teeth that only extend around a portion of a circumference of the spur gear, such as 270 degrees around the spur gear. In such embodiments, a portion of the spur gear that does not include gear teeth could be utilized as a stop portion, a free-rotation portion, or the like.

During a tooling/die engagement operation in which the die 142 is moveable relative the pipe 12, the second motor 44 rotates the worm gear 158 to thereby impart rotation to the spur gear 162, which in turn rotates the die shaft 114 and die 142 between a first position (FIGS. 5A and 6A) in which the die 142 is distanced from the pipe 12 and a second position (FIGS. 5B and 6B) in which the die 142 engages the pipe 12 to form the groove 110. In contrast to typical tooling/die engagement mechanisms, the tooling/die engagement operation of the present disclosure utilizes rotation of a motor (e.g., second motor 44) separate from a drive motor (e.g., first motor 42) to vary a spacing between the die/output axis 134 and the pipe 12 and drive axis 54. Because the die axis 134 is eccentric (i.e. offset) relative the die shaft axis 118, rotation of the die shaft 114 varies a spacing between the drive axis 54 and die output axis 134.

Once the second motor 44 has been actuated/energized a sufficient amount to contact the die 142 to the pipe 12, a user may energize the first motor 42 to rotate the spindle 98 via the drive assembly 70. Once the spindle 98 begins to rotate, a user may release the tool 10 to rotate about the pipe 12 as the groove 110 is being formed. Stated another way, once the grooving process begins, a user may release the tool 10 and allow the tool 10 to walk around an outer surface of the pipe 12 to form the groove 110 therein. In other embodiments, a user maintains hold of the tool such that the pipe 12 rotates relative the tool 10. The second motor 44 may continue to be energized during the grooving process to maintain the die 142 against the pipe 12 and/or drive the die 142 further into the pipe 12 to create a groove 110 with a desired depth.

As further illustrated in FIGS. 2, 5A, and 5B, the housing 14 includes a first sidewall 166*a*, a second sidewall 166*b* generally opposite the first sidewall 166*a*, and opposing third and fourth sidewalls 166*c*, 166*d*. With reference to FIG. 2, the first and second sidewalls 166*a*, 166*b* are arranged relative one another at an acute angle and are connected on either end by the third and fourth sidewalls 166*c*, 166*d*. In the illustrated embodiment, two of the sidewalls are generally flat and two of the sidewalls are generally curved, although other geometries of sidewalls are considered. With specific reference to FIGS. 5A and 5B, the first sidewall 166*a* of the housing 14 is offset relative the input drive axis 56 by an acute angle such that a portion of the housing 14 and the input drive axis 56 are arranged in a V-shape. This V-shape advantageously provides the housing 14 with a compact overall footprint.

As illustrated in FIGS. 5B and 6B, the die 142 is moveable to the second position to engage the pipe 12 and form the groove 110. Movement of the die 142 is facilitated via the eccentric arrangement of the die shaft axis 118 and the die axis 134. As shown in FIGS. 6A and 6B, the shaft axis 118 is positioned above the die axis 134 while the die 142 is in the first/disengaged position (FIG. 6A) and the shaft axis 118 is positioned below the die axis 134 while the die 142 is in the second/engaged position (FIG. 6B). Further, the shaft 114 remains rotated about shaft axis 118 through the first and second positions while an axial spacing of the die axis 134 and the shaft axis 118 varies through the first and second positions.

During a groove forming operation, a significant amount of resistance or push-back force may be generated by the pipe 12 and imparted on the die 142 in a radially-outward direction as the tool 10 rotates relative to the pipe 12. Such push-back may cause typical tooling dies to back-off the pipe 12. In the illustrated embodiment, the second motor 44 and second gear assembly 68 are operable to output a maximum radial force of at least 150,000 Newtons (N) to the pipe 12 via the die 142. The second gear assembly 68 also resists a maximum push-back force of at least 150,000 N due to the large back-drive torque reduction provided by the worm gear 158. As such, the second motor 44 is not back-driven by the push-back force during operation, and no clutch or locking mechanism is required to prevent the die 142 from backing off of the pipe 12 during operation. In other embodiments, the second motor 44 and second gear assembly 68 may be operable to output a maximum force of at least 125,000 N, at least 100,000 N, or at least 75,000 N, or in a range between 75,000 N and 150,000 N.

In some embodiments, the roll groover 10 is configured to output a maximum radial force on the pipe of at least 12,500 N per millimeter of wall thickness of the pipe 12. In other embodiments, the roll groover 10 is configured to output a maximum radial force on the pipe of at least 10,000 N, at least 8,000 N, or in a range between 8,000 and 12,500 N per millimeter of wall thickness of the pipe 12. While the preferred embodiment of the roll groover 10 is configured to form the groove 110 in an outer surface/wall of the pipe 12, other arrangements of the roll groover 10 for forming a groove in another part of the pipe (e.g., inner surface) are contemplated.

In some embodiments, either or both of the gear assemblies 66, 68 are configured to output between approximately 100-400 Newton-meters of torque. The first and second motors 42, 44 may be operable to output different amounts of torque or the same amount of torque depending on the arrangement of the tool 10. In still other embodiments, one of the first motor 42 or the second motor 44 may be omitted and substituted by a Sprag bearing/clutch in order to drive both of the drive assemblies 70, 72 from a single electric motor. Such a Sprag bearing and/or clutch arrangement could also be utilized to produce multiple output speeds for a single given input speed provided by a single motor. A similar one-way clutch arrangement that could be used with the illustrated roll groover 10 is described in co-pending and co-owned U.S. Utility patent application Ser. No. 17/187,265, filed Feb. 26, 2021, the entire contents of which are incorporated herein by reference.

Figures 7A, 7B:
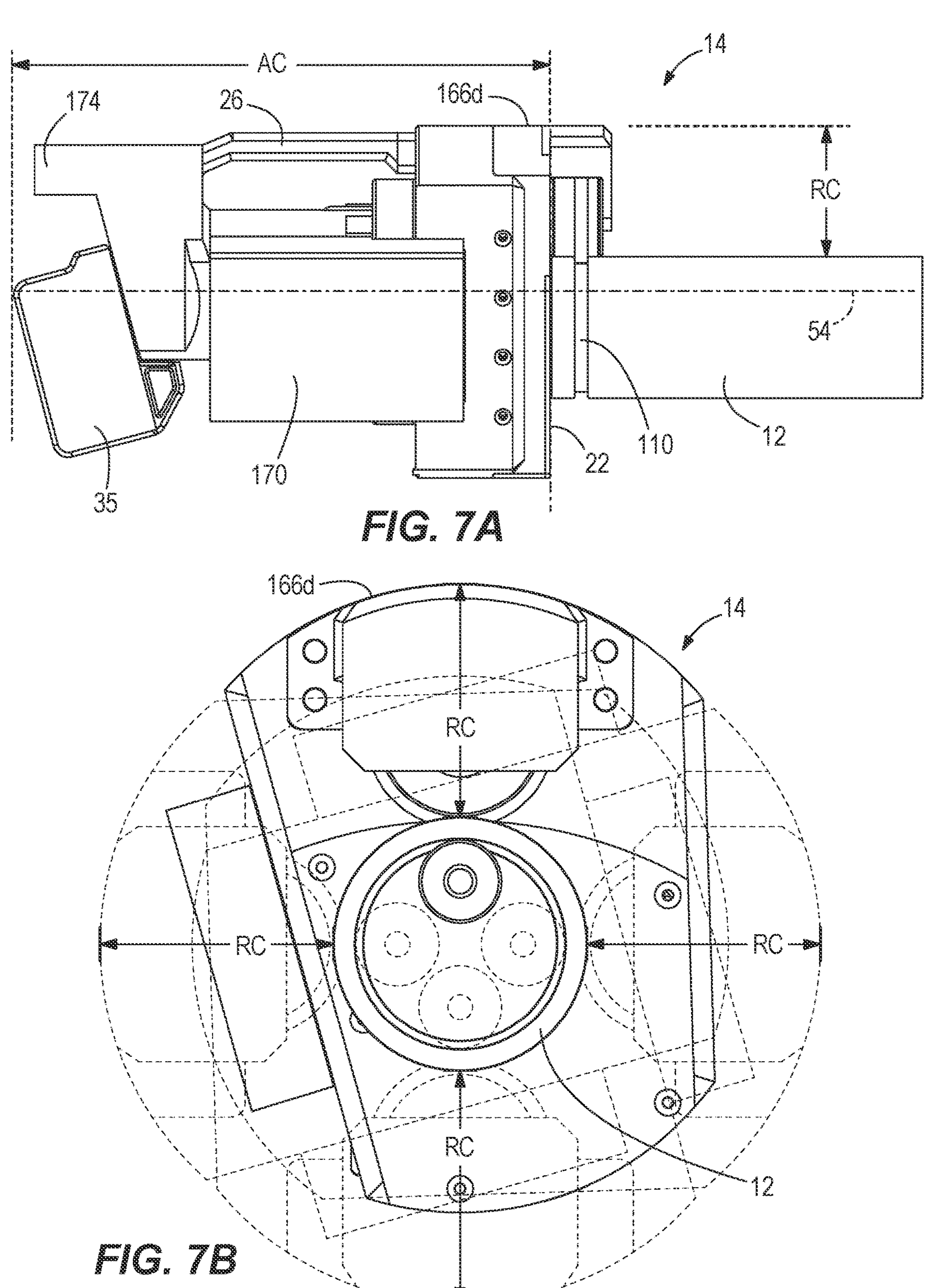
FIG. 7A is a side plan view of the tool of FIG. 1.
FIG. 7B is a plan view of the tool of FIG. 1.

Referring now to FIGS. 7A and 7B, the illustrated roll groover 10 is configured to receive pipes having a diameter of approximately 14 inches or less. The roll groover 10 defines a radial clearance RC (e.g., extent of a radial profile of the groover 10) between a terminating side of the housing 14, such as the fourth side 166*d* of the housing 14, and an outer surface of the pipe 12 in which the groove 110 is formed. In the illustrated embodiment, the radial clearance RC of the tool 10 is approximately 5 inches or less. In other embodiments that utilize a larger power source or groove a larger pipe, the radial clearance may be larger than 5 inches.

The illustrated roll groover 10 further defines an axial clearance AC (e.g., extent of an axial profile of the groover 10) between a terminating end of the housing 14, such at a tip of the battery pack 34, and a distal end of the pipe 12 adjacent the front housing portion 22. In the illustrated embodiment, the axial clearance AC of the tool 10 is approximately 15 inches or less. In other embodiments that utilize a larger power source or groove a larger pipe, the axial clearance may be larger than 15 inches.

As further illustrated in FIG. 7A, the roll groover 10 may include a second handle 170 positioned on the housing 14 and a third handle 174 positioned adjacent the battery 34 and axially aligned with the drive axis 54. Each handle portion 26, 170, 174 may include one or more gripping surface to increase the amount of graspable locations on the groover 10. In the illustrated embodiment, at least one grip surface is located within about 5 inches of a center of gravity of the tool 10 along an axial direction (e.g., parallel to the drive axis 54).

In the illustrated embodiment, the battery 34 is mounted to the housing 14 at an end opposite the pipe 12. In some embodiments, the battery 34 may be received in the battery receptacle 38 in another orientation. For example, the battery 34 may be received on the housing 14 such that a center of gravity of the battery 34 lies along the axial direction of the tool 10. The battery 34 could alternately be mounted to the housing 14 in a central part of the tool 10, such as near below the handle housing portion 26. In still other embodiments, the battery may be mounted to the tool at a center of gravity of the tool or even to provide a new center of gravity of the tool that provides further control or balance of the tool during operation. In some embodiments, the battery pack 34 may be replaced with and/or assisted by a remote battery pack attachable to the tool housing 14 via a slip ring.

Figure 8A:
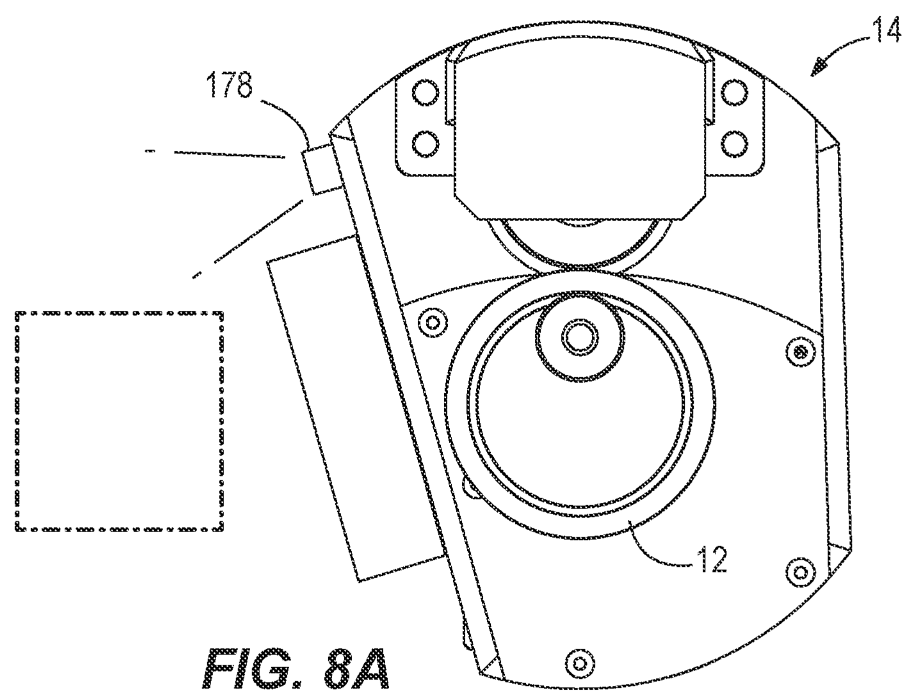
FIG. 8A is a schematic view of an obstacle sensor for use with the tool of FIG. 1.

Referring now to FIG. 8A, the illustrated roll groover 10 includes an obstacle sensor 178 mounted to a portion of the tool housing 14. The obstacle sensor 178 may be a proximity sensor, such as a LiDAR sensor or the like that is positioned on a rotating part of the housing 14 (e.g., a part of the tool 10 that rotates around the pipe 12). In some embodiments, multiple obstacle sensors 178 may be provided on the roll groover 10 to detect if an obstacle is present in a rotating path of the roll groover 10 around the pipe 12 (e.g., if any objects may interfere with the operation of the roll groover 10). The sensors 178 are configured to stop operation of the roll groover 10 when an object is detected in the path of the roll groover 10. Other sensors useable with roll groover 10, such as ultrasonic sensors, sonar sensors, laser sensors, optical sensors, and the like are disclosed in co-pending and co-owned U.S. Provisional Patent Application No. 63/093,577, filed Oct. 19, 2020, the entire contents of which are incorporated herein by reference. One particular sensor and measurement method disclosed in U.S. Provisional Patent Application No. 63/093,577 is a sensor operable to determine an absolute/exact position of the die 142, the eccentric die shaft 114, second drive assembly 72, the pipe 12, and the like.

Figure 8B:
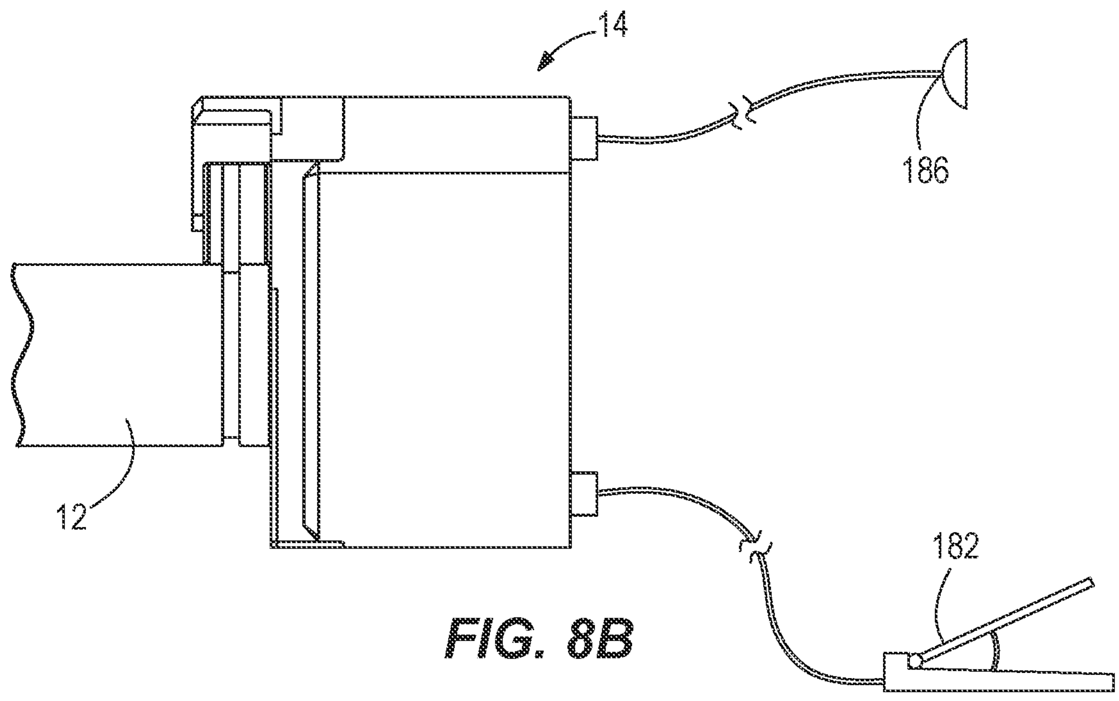
FIG. 8B is a schematic view of a remotely operated actuator for use with the tool of FIG. 1.

With reference to FIG. 8B, the roll groover 10 further includes a remote actuator 182 configured for operating the roll groover 10 remotely, which may allow a user the ability to start and stop operation of the roll groover 10 without the need to engage with a rotating tool. The remote actuator 182 may be a foot pedal that is actuatable to energize one or more of the motors. The remote actuator 182 may include one or more sensors 186 additionally configured to stop operation of the roll groover 10. In some embodiments, the foot pedal must be held down by a user for the groover 10 to operate (e.g., similar to a conventional "dead man switch"). For example, if a user lifts pressure from the actuator 182, the groover 10 stops. The groover 10 may further include an emergency stop positioned directly on the groover 10, such as on the housing 14. In one embodiment, the emergency stop is a pressable ring that extends around a circumference of the groover tool 10 such that a user can halt operation of the tool 10 by pressing any point on the ring around the tool 10. In a preferred embodiment, the ring is positioned within 3 inches of the pipe 12. U.S. Provisional Patent Application No. 63/093,577 (cited above) discloses additional safety and/or operation features that may be incorporated into the illustrated roll groover 10.

Figures 9, 10:
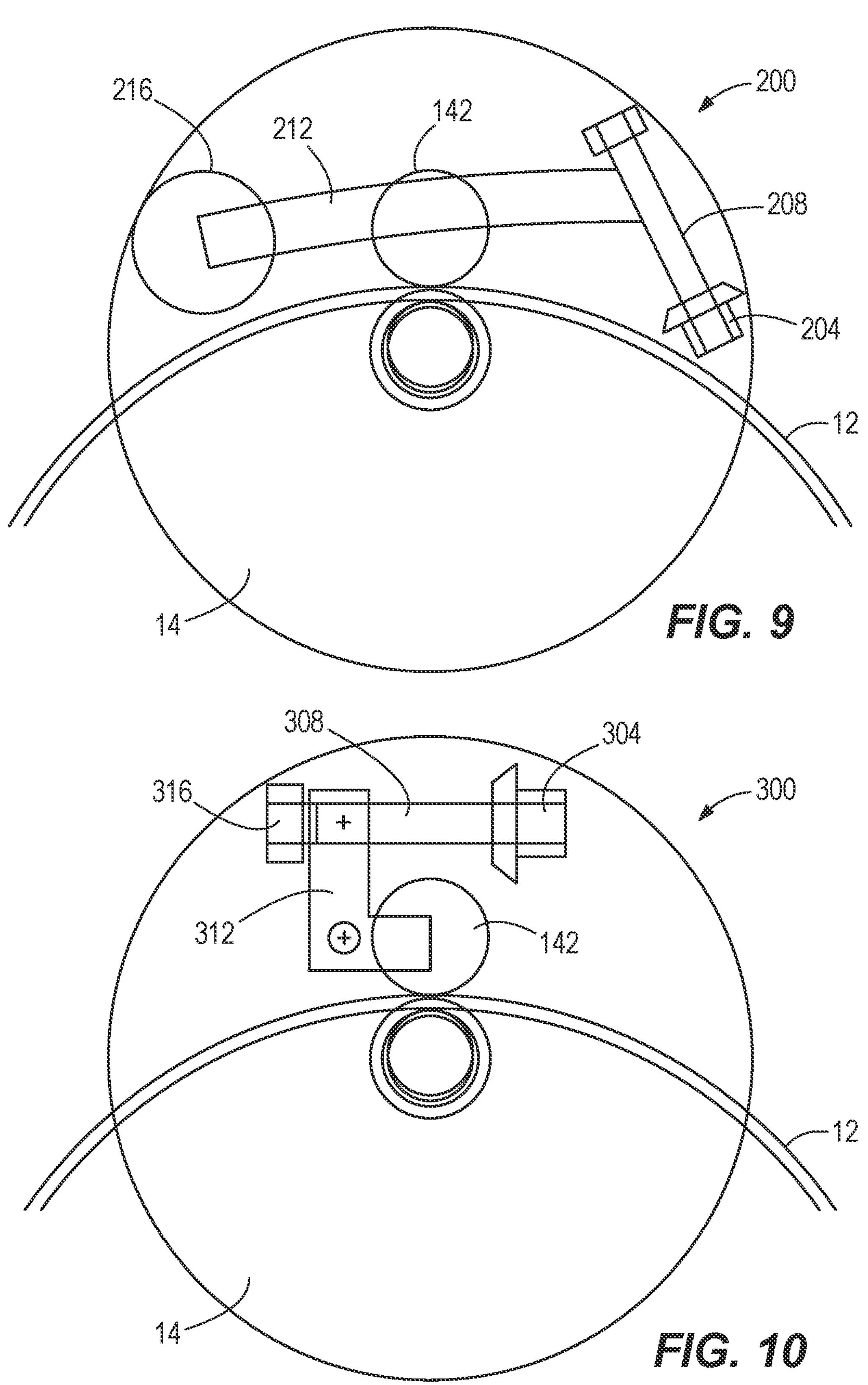
FIGS. 9-14 are schematic representations of alternate input drive assemblies for use with the tool of FIG. 1.

FIG. 9 illustrates a schematic representation of an alternative input drive assembly 200 usable with the roll groover tool 10 discussed above with reference to FIGS. 1-8B (e.g., in place of the second drive assembly 72). For example, the worm and spur gears 158, 160 may be replaced by a bevel gear 204 and a lead screw 208 each supported on the housing 14 adjacent an edge of the housing 14. In the illustrated drive assembly 200 of FIG. 9, the lead screw 208 is mounted in the housing 14 and rotatable by one of the motors 42, 44 and/or by a hand crank. A lever arm 212 is attached to a varying-height portion of the lead screw 208 at one end and supported by a rigid lever arm support member 216 at another end. The grooving die 142 is mounted to the lever arm 212 between the lead screw 208 and the arm support member 216 such that rotation of the lead screw 208 varies a distance between the die 142 and the pipe 12. In this manner, the lever arm 212 is at least partially rotatable and axially moveable relative the housing 14.

FIG. 10 illustrates a schematic representation of another alternative input drive assembly 300 usable with the roll groover tool 10 discussed above with reference to FIGS. 1-8B (e.g., in place of the second drive assembly 72). The input drive assembly 300 is operable in a very similar manner to the input drive assembly 200, with the exception relating to how a bevel gear 304 and a lead screw 308 are oriented in the housing 14. As shown in FIG. 10, the bevel gear 304 is rotatable by one of the motors 42, 44 and/or by a hand crank. A lever arm 312 supports the die 142 and is rotatably coupled to the lead screw 308, which is rotatably supported by a mount 316. The lever arm 312 may be eccentrically attached to the lead screw 308 such that rotation of the bevel gear 304 and the lead screw 308 vary a distance between the die 142 and the pipe 12.

Figures 11, 12:
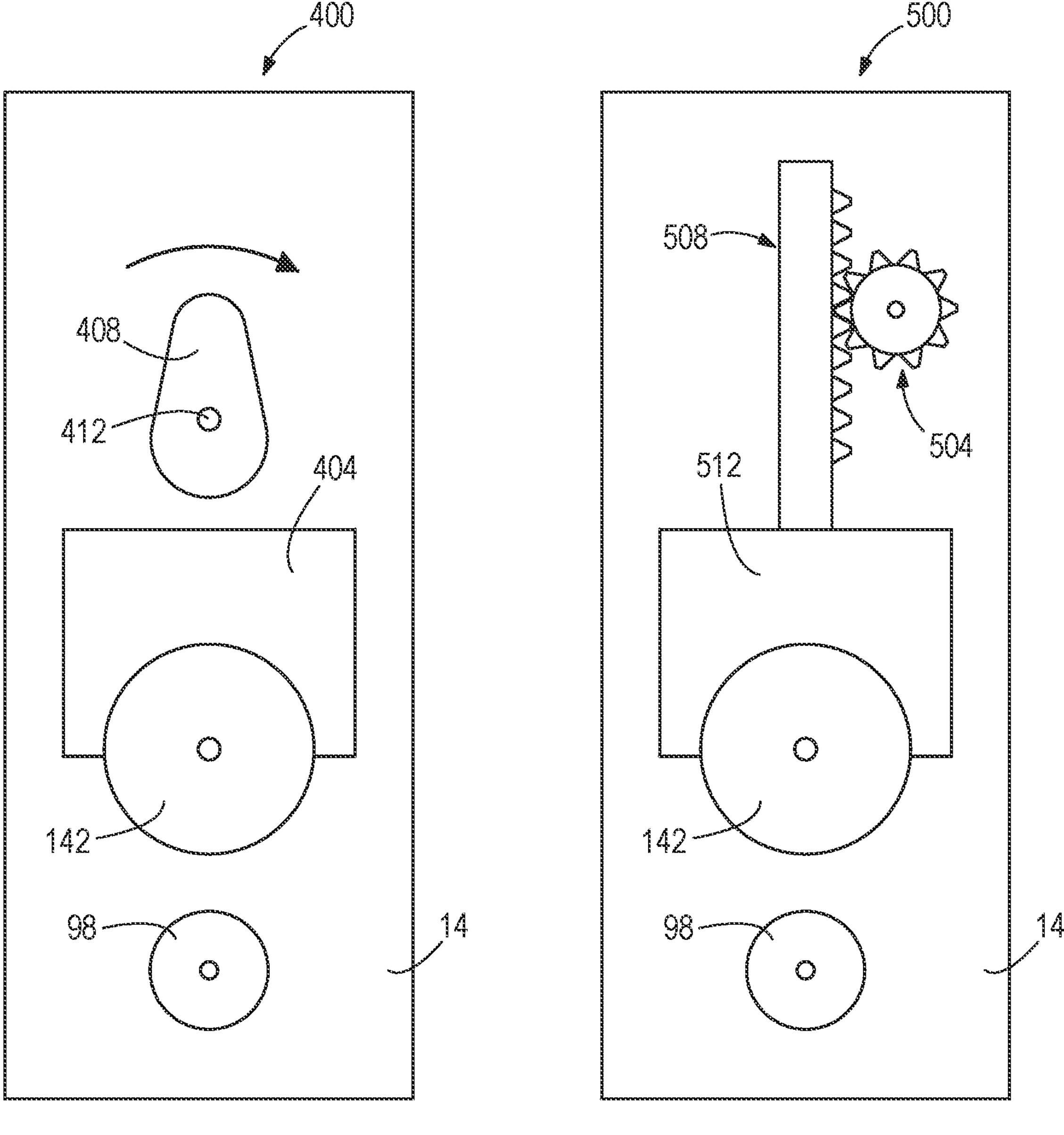

FIG. 11 illustrates a schematic representation of another alternative input drive assembly 400 usable with the roll groover tool 10 discussed above with reference to FIGS. 1-8B (e.g., in place of the second drive assembly 72). For example, the die 142 is rotatably couple to a block 404 that is axially moveably relative the housing 14. The input drive assembly 400 includes an input drive member 408 in the form of a shaft 408 including an oblong cam surface. The shaft 408 is rotatable, via one of the motors 42, 44, about a rotational axis 412 that is eccentric relative a central point of the shaft 408. As the shaft 408 is rotated, the cam surface contacts the block 404 to move the block 404 and die 142 axially toward the spindle 98. The input drive assembly 400 further includes a spring that urges the die 142 and block 404 toward the shaft 408 and away from the spindle 98.

FIG. 12 illustrates a schematic representation of another alternative input drive assembly 500 usable with the roll groover tool 10 discussed above with reference to FIGS. 1-8B (e.g., in place of the second drive assembly 72). The input drive assembly 500 operates in the same way as the input drive assembly 400 except that the shaft 408 is replaced with a rack and gear assembly. The rack and gear assembly includes a gear 504 rotatably supported in the housing 14 and configured to mesh with a rack 508 to drive the rack 508 in a downward direction. As the gear 504 rotates, the rack 508 is driven against a block 512, which presses the die 142 toward the spindle 98 and thus the pipe 12. A spring drives the block 512 and die 142 back toward the rack 508 and away from the spindle 98.

Figures 13, 14, 15:
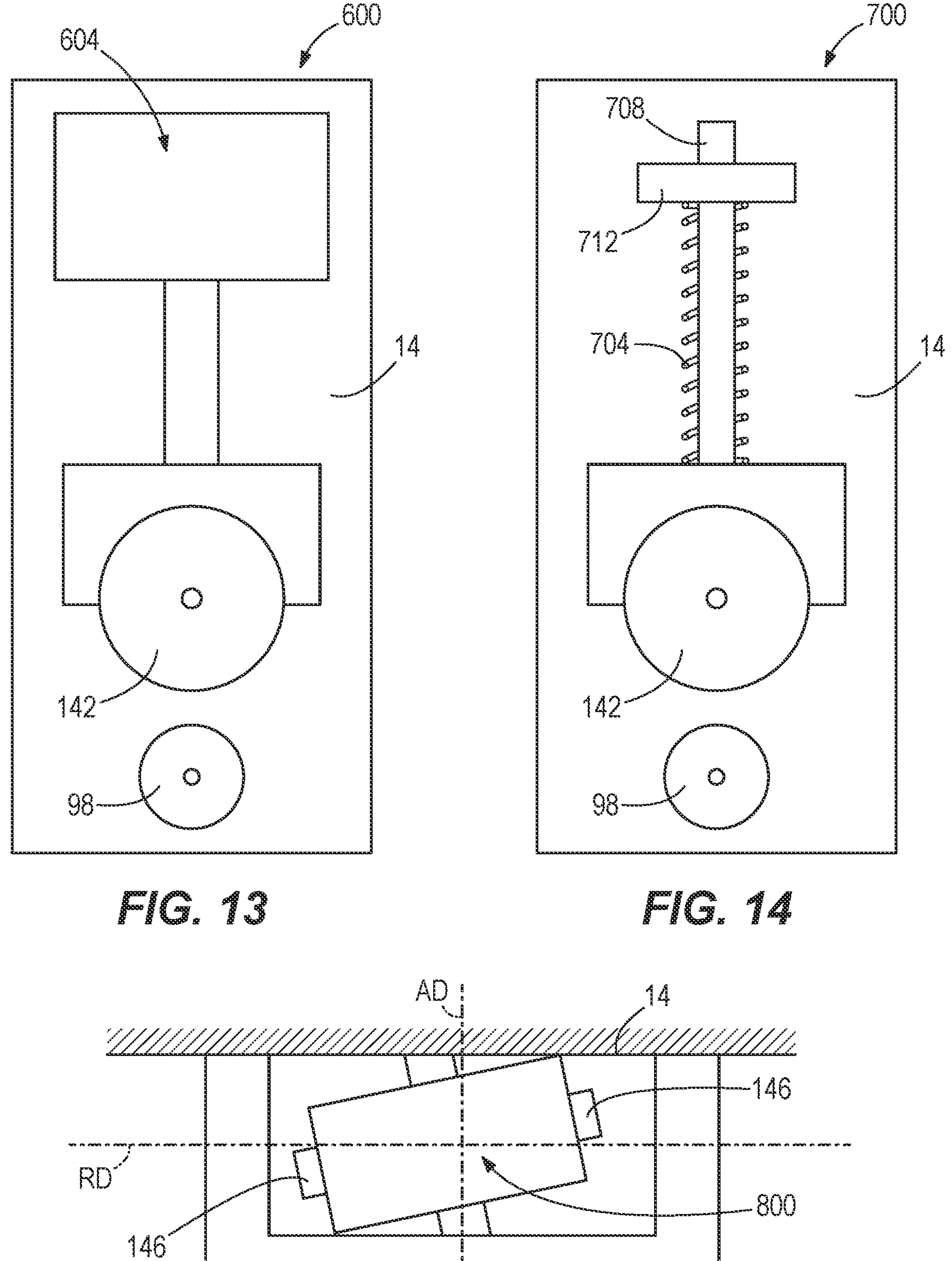
FIG. 15 is a schematic representation of an angled grooving member for use with the tool of FIG. 1.

FIG. 13 illustrates a schematic representation of another alternative input drive assembly 600 usable with the roll groover tool 10 discussed above with reference to FIGS. 1-8B (e.g., in place of the second drive assembly 72). For example, portions of the second drive assembly 72 can be replaced with a hydraulic actuator 604 that includes a pump, reservoir, and ram assembly. The actuator 604 is actuatable to press the die 142 toward the spindle 98. The input drive assembly 600 further includes a spring that presses the die 142 back toward the actuator 604. In other embodiments, the die 142 is rigidly attached to the actuator 604 such the die 142 follows extension and retraction of the hydraulic actuator 604 relative the housing 14.

FIG. 14 illustrates a schematic representation of another alternative input drive assembly 700 usable with the roll groover tool 10 discussed above with reference to FIGS. 1-8B (e.g., in place of the second drive assembly 72). For example, the drive assembly 700 includes a spring 704 supported on a guide rod 708. The spring 704 provides a spring force that presses the die 142 toward the spindle 98. The input drive assembly 700 further includes a retracting mechanism 712 (e.g., lead screw, eccentric shaft, or the like discussed herein) configured to pull the spring 704 back against the spring force and retract the spring 704 and thus the die 142 from the spindle 98/pipe 12.

FIG. 15 illustrates a schematic representation of an angled grooving member or die 800 configured for use with the second drive assembly 72, or any of the alternative drive assemblies described herein for the roll groover tool 10. The angled die 800 may be selectively engaged with the pipe 12 by way of any of the methods discussed herein. In some embodiments, the roll groover 10 can use a plurality of dies including the die 142 and the angled die 800 to roll or form the groove 110 into the pipe 12. One benefit of the angled die 800 is that the peaks 146 will thread into the pipe 12 as the tool 10 walks around the pipe 12. Such angled die 800 may cause the tool 10 to be secured to the pipe 12 with a greater force/advantage than that provided by a non-angled die. Stated another way, the angle applied to the die 800 will cause the die 800 to dig into the pipe 12 along a radial direction RD and toward the tool 10 along an axial direction AD.

Although the invention has been described in detail with reference to certain preferred embodiments, variations and modifications exist within the scope and spirit of one or more independent aspects of the invention as described.

What is claimed is:

1. A tool comprising:

a housing;

a spindle rotatable about a drive axis; and a drive assembly including an electric motor configured to rotate the spindle about the drive axis and thereby rotate the tool with respect to a pipe and a battery removably coupled to the housing, wherein the electric motor is powered by the battery.

2. The tool of claim 1, further comprising a die shaft defining a die shaft axis and a die shaft drive portion, wherein the electric motor is a first electric motor, further comprising a second electric motor configured to drive the die shaft drive portion such that rotation of an output shaft of the second electric motor varies a distance between the die shaft axis and the drive axis.

3. The tool of claim 2, wherein the first electric motor and the second electric motor are powered by the battery.

4. The tool of claim 2, wherein the battery is a first battery, further comprising a second battery removably coupled to the housing, wherein the first electric motor is powered by the first battery and the second electric motor is powered by the second battery.

5. The tool of claim 2, wherein the electric motor is operable to apply a maximum radial force to the pipe between 75,000 Newtons and 150,000 Newtons.

6. The tool of claim 2, wherein the pipe has a diameter and a wall thickness, and wherein the electric motor is operable to apply a maximum radial force to the pipe between 8,000 Newtons and 12,500 Newtons per millimeter of the wall thickness.

7. The tool of claim 2, wherein the drive assembly further includes a first gear supported by the die shaft, and a second gear rotatably supported by the die shaft drive portion, wherein the second gear is configured to mesh with the first gear to rotate the die shaft.

8. The tool of claim 7, wherein the first gear is a worm pinion, and wherein the second gear is a worm gear.

9. The tool of claim 7, wherein the first gear and the second gear prevent back-driving of the electric motor.

10. The tool of claim 2, wherein the tool weighs less than fifty-two pounds.

11. The tool of claim 1, wherein the tool defines a radial clearance between a terminating side of the housing and an outer surface of the pipe, and wherein the radial clearance of the tool is 8 inches or less.

12. The tool of claim 1, wherein the tool defines an axial clearance between a terminating end of the housing supporting the battery and a distal end of the pipe, and wherein the axial clearance of the tool is 15 inches or less.

13. A tool comprising:

a housing;

a spindle rotatable about a drive axis;

a battery receptacle configured to receive a battery;

a first motor configured to rotate the spindle about the drive axis and thereby rotate the tool with respect to a pipe;

a die rotatably coupled to a die shaft about a die axis that is offset relative the drive axis, wherein the die is configured to create a groove into the pipe; and a second motor configured to rotate an input shaft about an input shaft axis to rotate the die shaft and vary a distance between the die axis and the drive axis.

14. The tool of claim 13, wherein the input shaft axis is offset by a non-zero angle relative the drive axis.

15. The tool of claim 13, wherein the drive axis and the die axis are parallel, and wherein the input shaft axis and the die axis are offset and not coplanar with one another.

16. The tool of claim 13, wherein the input shaft axis and a portion of housing are angled relative one another by an acute angle such that the input shaft axis and the portion of the housing are arranged in a V-shape.

17. The tool of claim 13, wherein the first motor and the second motor are operable at different speeds.

18. The tool of claim 13, wherein the first motor and the second motor are configured to output different amounts of torque.

19. A tool comprising:

a housing;

a spindle rotatable about a drive axis;

a first electric motor configured to rotate the spindle about the drive axis and thereby rotate the tool with respect to a pipe;

a die rotatably coupled to a die shaft about a die axis that is offset relative the drive axis, wherein the die is configured to create a groove into the pipe;

a second electric motor operable to clamp the pipe between the spindle and the die; and a battery removably coupled to the housing, wherein the first electric motor and the second electric motor are powered by the battery.

* * * * *